US008391555B2

(12) United States Patent
Sakamoto

(10) Patent No.: US 8,391,555 B2
(45) Date of Patent: Mar. 5, 2013

(54) LANE RECOGNITION APPARATUS FOR VEHICLE, VEHICLE THEREOF, AND LANE RECOGNITION PROGRAM FOR VEHICLE

(75) Inventor: Yosuke Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1014 days.

(21) Appl. No.: 12/378,509

(22) Filed: Feb. 17, 2009

(65) Prior Publication Data

US 2009/0245582 A1 Oct. 1, 2009

(30) Foreign Application Priority Data

Mar. 26, 2008 (JP) ................................ 2008-080496

(51) Int. Cl.

| | |
|---|---|
| ***G06K 9/00*** | (2006.01) |
| ***G06K 9/34*** | (2006.01) |
| ***G06K 9/46*** | (2006.01) |
| ***G06K 9/66*** | (2006.01) |
| ***G06K 9/62*** | (2006.01) |
| ***G06K 9/36*** | (2006.01) |
| ***G06K 9/20*** | (2006.01) |
| ***H04N 7/00*** | (2011.01) |
| ***H04N 7/18*** | (2006.01) |
| ***H04N 5/225*** | (2006.01) |
| ***G01C 22/00*** | (2006.01) |
| ***G05D 1/00*** | (2006.01) |

(52) U.S. Cl. ........ 382/104; 382/173; 382/190; 382/224; 382/282; 348/118; 348/169; 701/28

(58) Field of Classification Search .................. 382/100, 382/103–104, 108, 153–154, 181, 190–191, 382/195, 199, 203, 206, 224–225, 254, 260–261, 382/264, 276, 281–283, 286–287; 348/61, 348/113–116, 118–119, 143, 148–149, 169; 701/23–28

See application file for complete search history.

(56) References Cited

U.S. PATENT DOCUMENTS 6,449,383 B1 * 9/2002 Oike et al. .................... 382/104
6,631,206 B1 * 10/2003 Cheng et al. .................. 382/164

(Continued)

FOREIGN PATENT DOCUMENTS

| | | |
|---|---|---|
| JP | 04-199379 A | 7/1992 |
| JP | 11-053691 | 2/1999 |
| JP | 2004-326355 A | 11/2004 |

OTHER PUBLICATIONS

Hyun-Chul; Se-Young Oh;, "Illumination invariant lane color recognition by using road color reference & neural networks," Neural Networks (IJCNN), The 2010 International Joint Conference on , vol., No., pp. 1-5, Jul. 18-23, 2010.*

(Continued)

*Primary Examiner* — Randolph I Chu
*Assistant Examiner* — Nathan Bloom
(74) *Attorney, Agent, or Firm* — Carrier Blackman & Associates, P.C.; Joseph P. Carrier; William D. Blackman

(57) ABSTRACT

A lane recognition apparatus for the vehicle includes: a lane mark detection image acquisition device which acquires an image divided into a first image region composed of pixels having pixel values supposed to be image portions of a lane mark defining the lane and a second image region composed of other pixels from a color image of a road; a clustering device which divides the first image region into subregions each composed of adjacent pixels; a color determination device which determines a color of the subregions; a lane recognition device which performs line component extraction for each group, considering the subregions determined to have the same color as a single group, and recognizes a line position of the lane defined by the lane mark from the extracted line component; and a vehicle equipment control device which controls equipment of a subject vehicle according to the lane recognition result.

16 Claims, 9 Drawing Sheets

I6
C12
C6
C5
C11
C4
C10
C3
C9
C2
C8
C1
C7

U.S. PATENT DOCUMENTS

| | | | | |
|---|---|---|---|---|
| 7,459,664 | B2 * | 12/2008 | Schofield et al. | 250/208.1 |
| 2002/0042676 | A1 * | 4/2002 | Furusho | 701/300 |
| 2004/0081368 | A1 * | 4/2004 | Mathew et al. | 382/268 |
| 2007/0013793 | A1 * | 1/2007 | Konda et al. | 348/241 |
| 2008/0317282 | A1 * | 12/2008 | Unoura | 382/103 |
| 2008/0317288 | A1 * | 12/2008 | Aoki et al. | 382/104 |
| 2009/0080704 | A1 * | 3/2009 | Mori et al. | 382/104 |
| 2009/0123065 | A1 * | 5/2009 | Kobayashi et al. | 382/165 |
| 2009/0167864 | A1 * | 7/2009 | Unoura | 348/148 |
| 2009/0284597 | A1 * | 11/2009 | Nakamori et al. | 348/148 |

OTHER PUBLICATIONS

Apostoloff, N. E. Vision based lane tracking using multiple cues and particle filtering. Masters thesis, The Australian National University. Feb. 2005.*

Chao Ma; Mei Xie; , "A Method for Lane Detection Based on Color Clustering," Knowledge Discovery and Data Mining, 2010. WKDD '10. Third International Conference on , vol., No., pp. 200-203, Jan. 9-10, 2010.*

Hillel and Lerner et al, "Recent progress in road and lane detection: a survey", Machine Vision and Applications 2012, Springer Berlin/ Heidelberg, DOI: 10.1007/s00138-011-0404-2.*

G. Zhi and W. Guo, "Study on the Lane Mark Identification Method in Intelligent Vehcile Navigation", Computer and Information Science Journal vol. 1 No. 4, Nov. 2008, www.ccsenet.org/journal.html.*

Aoki, Tomoyoshi ; WO/2006/117951; Nov. 2006; PCT/JP2006/306313; Honda Motor Co. LTD.*

Mori, Naoki ; WO/2007/000911; Jan. 2007; PCT/JP2006/312290; Honda Motor Co. LTD.*

Aoki, Tomoyoshi; WO/2007/004439; Jan. 2007; PCT/JP2006/312589; Honda Motor Co. LTD.*

Ben Romdhane, Nadra, Mohamed Hammami, and Hanene Ben-Abdallah. "A comparative study of vision-based lane detection methods." Advances Concepts for Intelligent Vision Systems (2011): 46-57.*

Veit, T.; Tarel, J.-P.; Nicolle, P.; Charbonnier, P.; , "Evaluation of Road Marking Feature Extraction," Intelligent Transportation Systems, 2008. ITSC 2008. 11th International IEEE Conference on , vol., No., pp. 174-181, Oct. 12-15, 2008.*

Tsung-Ying Sun; Shang-Jeng Tsai; Chan, V.; , "HSI color model based lane-marking detection," Intelligent Transportation Systems Conference, 2006. ITSC '06. IEEE , vol., No., pp. 1168-1172, Sep. 17-20, 2006.*

Rotaru, C.; Graf, T.; Jianwei Zhang; , "Extracting road features from color images using a cognitive approach," Intelligent Vehicles Symposium, 2004 IEEE , vol., No., pp. 298-303, Jun. 14-17, 2004.*

McCall, Joel C., and Mohan M. Trivedi. "Video-based lane estimation and tracking for driver assistance: survey, system, and evaluation." Intelligent Transportation Systems, IEEE Transactions on 7.1 (2006): 20-37.*

Sunghoon Kim; Jeong-Ho Park; Seong Ik Cho; Soonyoung Park; Kisung Lee; Kyoungho Choi; , "Robust Lane Detection for Video-Based Navigation Systems," ICTAI 2007. 19th IEEE International Conference on , vol. 2, No., pp. 535-538, Oct. 29-31, 2007.*

D'Cruz, C.; Jua Jia Zou; , "Lane detection for driver assistance and intelligent vehicle applications," Communications and Information Technologies. International Symposium on , vol., No., pp. 1291-1296, Oct. 17-19, 2007.*

Pangyu Jeong; Nedevschi, S.; , "Efficient and robust classification method using combined feature vector for lane detection," Circuits and Systems for Video Technology, IEEE Transactions on , vol. 15, No. 4, pp. 528-537, Apr. 2005.*

* cited by examiner

IMAGE PROCESSING UNIT
10
11
IMAGE ACQUISITION DEVICE
12
LANE MARK DETECTION IMAGE ACQUISITION DEVICE
31
KERNEL SETTING DEVICE
32
SMOOTHING DEVICE
33
CHANGE DEGREE CALCULATION DEVICE
34
PIXEL VALUE REPLACEMENT DEVICE
13
CLUSTERING DEVICE
14
COLOR DETERMINATION DEVICE
15
LANE RECOGNITION DEVICE
16
TYPE DETERMINATION DEVICE
20
ECU
21
VEHICLE EQUIPMENT CONTROL DEVICE
2

LANE RECOGNITION APPARATUS FOR VEHICLE, VEHICLE THEREOF, AND LANE RECOGNITION PROGRAM FOR VEHICLE

BACKGROUND OF THE INVENTION

1. Field of the Invention

The present invention relates to an apparatus for recognizing a lane along which a vehicle is traveling by processing an image of a road acquired via an imaging device, a vehicle thereof, and a program for causing a computer to perform processing of the apparatus.

2. Description of the Related Art

In recent years, there is known a technique of capturing images of a road along which a vehicle is traveling, detecting lane marks such as white and yellow lines on the road by processing acquired color images, and performing traveling controls of the vehicle and information presentation to a driver on the basis of the information on a lane (traffic lane), along which the vehicle is traveling, recognized as a result of the detection, with an imaging device such as a CCD camera mounted on the vehicle (for example, refer to Japanese Patent Laid-Open No. Hei 11-053691/1999).

In the lane recognition method described in the above official gazette, an edge histogram is derived by differentiating the density of all pixels of an image of a road ahead of a subject vehicle and calculating the sum of density derivatives at each pixel in the radial direction in a region around the focus of expansion. In this recognition method, the white and yellow lines on the road are recognized out of a plurality of candidate lines each having a peak density derivative in the edge histogram. More specifically, in the above recognition method, a candidate line having an extremely high peak value is determined to be a white line among the candidate lines selected from the edge histogram, and a candidate line including a strong R component, if any, is determined to be a yellow line on the road among the candidate lines superimposed on an image whose R component is enhanced.

In the recognition method described in the above official gazette, the white and yellow lines are detected as lane marks. Lane marks provided on the road, however, include those of various colors and types, in addition to linear lane marks such as traffic section lines (white and yellow lines). For example, there are used stud-type lane marks, which are provided discretely, such as Botts Dots and a cat's eye.

Moreover, the linear lane marks further include solid-line and broken-line lane marks. Further, for example, red color is sometimes used as a lane mark color in addition to the white and yellow colors. Since the lane marks of different colors or types have different meanings in the road rules in some cases, it is desirable to appropriately recognize the various lane mark colors or types in order to perform traveling controls of the vehicle and to present information to the driver.

SUMMARY OF THE INVENTION

Therefore, it is an object of the present invention to provide a lane recognition apparatus for a vehicle capable of recognizing a lane by distinguishing differences among lane marks of various colors and types from a color image of a road along which the vehicle is traveling, a vehicle thereof, and a lane recognition program for a vehicle.

Further, it is another object of the present invention to provide a lane recognition apparatus for a vehicle capable of recognizing the color and type of a lane mark defining a lane accurately to perform traveling controls of the vehicle and to present information to a driver on the basis of a result of the recognition.

In order to achieve the above object, the present invention has been provided. According to the present invention, there is provided a lane recognition apparatus for a vehicle which recognizes a lane along which a vehicle is traveling from a color image of a road acquired via an imaging device mounted on the vehicle, comprising: a lane mark detection image acquisition device which acquires a lane mark detection image, which is divided into a first image region composed of pixels having pixel values supposed to be image portions of a lane mark defining the lane and a second image region composed of other pixels, from the color image of the road acquired via the imaging device; a clustering device which performs clustering in which the first image region of the lane mark detection image is divided into subregions each composed of adjacent pixels; a color determination device which determines a color of the subregions of the first image region obtained by the division in the clustering; a lane recognition device which performs line component extraction for each group, considering the subregions determined to have the same color by the color determination device as a single group, and recognizes a line position of the lane defined by the lane mark from the extracted line component; and a vehicle equipment control device which controls equipment of the vehicle according to a recognition result of the lane recognition device (First aspect of the invention)

According to the lane recognition apparatus for the vehicle of the first aspect of the invention, the lane mark detection image acquisition device acquires the lane mark detection image, which is divided into the first image region composed of pixels having pixel values supposed to be image portions of the lane mark defining the lane and the second image region composed of other pixels. The first image region is separated from the second image region, for example, on the basis of characteristics of the luminance and color generally seen in the image portions of the lane mark. Then, the clustering device divides the first image region of the lane mark detection image into subregions each composed of adjacent pixels.

In this instance, for example, an image portion of an entire line in the case of a lane mark of a solid line type, an image portion of each line segment constituting a broken line in the case of a lane mark of a broken line type, and an image portion of each stud in the case of a lane mark of a stud type are supposed to be the region composed of adjacent pixels in the image. Therefore, the image portions of a single lane mark are obtained as the subregions by common processing, independently of the lane mark type such as a solid or broken line or a linear or stud type.

The color determination device determines the color of the subregions. Moreover, the lane recognition device performs line component extraction for each group, considering the subregions determined to have the same color by the color determination device as a single group, and recognizes the line position of the lane defined by the lane mark from the extracted line component. By performing the line component extraction for each group of the same color, the lane recognition device is capable of extracting the line component corresponding to the lane defined by the lane mark of each color with high accuracy to recognize the lane.

In this manner, the lane recognition device appropriately recognizes the lane defined by the lane mark by distinguishing differences among the lane marks of various colors and types. Therefore, the vehicle equipment control device is capable of appropriately controlling the equipment of the vehicle so as to cope with the possibility of the departure from the lane and to conform to the road rules according to the recognition result of the lane recognition device, thereby enabling traveling controls of the vehicle and information presentation to the driver.

Further, in the lane recognition apparatus for the vehicle of the first aspect of the invention, preferably the lane recognition device recognizes the color of the subregions constituting the group from which the line component is extracted as the color of the lane mark defining the lane recognized from the line component, and the vehicle equipment control device controls the equipment of the vehicle at least according to the line position of the lane recognized by the lane recognition device and the color of the lane mark defining the lane (Second aspect of the invention).

According to the lane recognition apparatus for the vehicle of the second aspect of the invention, it is possible to easily obtain the color of the lane mark defining the lane recognized from the line component on the basis of the color of the subregions constituting the group from which the line component is extracted. In addition, the vehicle equipment control device is capable of appropriately controlling the equipment of the vehicle in response to the meanings of the road rules and the driving condition of the vehicle on the basis of the lane line position and the color of the lane mark defining the lane.

Still further, preferably the lane recognition apparatus for the vehicle of the first or second aspect of the invention further comprises a type determination device which determines the type of the lane mark defining the lane recognized from the line component on the basis of a distribution state of the subregions, which exist in the vicinity of the line component, constituting the group from which the line component is extracted, and in the lane recognition apparatus, the vehicle equipment control device controls the equipment of the vehicle at least according to the line position of the lane recognized by the lane recognition device and the type of the lane mark defining the lane (Third aspect of the invention).

According to the lane recognition apparatus for the vehicle of the third aspect of the invention, for example, if the lane mark defining the lane recognized from a line component is of a broken line type, the distribution state of the subregions, which exist in the vicinity of the line component, constituting the group from which the line component is extracted, is supposed to be more discrete than that of a lane mark of a solid line type, and if the lane mark is of a stud type, the distribution state is supposed to be further more discrete. Therefore, the lane recognition apparatus for the vehicle is capable of recognizing the type of the lane mark defining the lane on the basis of the distribution state. Moreover, the vehicle equipment control device is capable of appropriately controlling the equipment of the vehicle in response to the meanings of the road rules and the driving condition of the vehicle on the basis of the line position of the lane and the type of the lane mark defining the lane.

Further, in the lane recognition apparatus for the vehicle of one of the first to third aspects of the invention, preferably the lane recognition device excludes a subregion whose predetermined direction width is outside a predetermined range set according to the width of the lane mark corresponding to the predetermined direction from an object of the line component extraction among the subregions (Fourth aspect of the invention).

According to the lane recognition apparatus for the vehicle of the fourth aspect of the invention, the subregion, whose predetermined direction width is outside the predetermined range set according to the width of the lane mark corresponding to the predetermined direction, is likely to be other than the image portion of the lane mark among the subregions. Therefore, it is possible to extract the line component corresponding to the lane more accurately and to recognize the lane appropriately by excluding the corresponding subregions from the objects of the line component extraction.

Still further, preferably, the lane recognition apparatus for the vehicle of one of the first to fourth aspects of the invention further comprises: a kernel setting device which sets a kernel having a size whose predetermined direction width is within a predetermined range greater than the predetermined direction width of the image portion of the lane mark for the color image acquired via the imaging device; a smoothing device which smoothes the acquired color image by filtering using the smoothing kernel of the size set by the kernel setting device; a change degree calculation device which calculates a change degree of a pixel value of each pixel of the acquired color image for the color image smoothed by the smoothing device; and a pixel value replacement device which replaces a pixel value of a pixel, whose change degree is equal to or less than a predetermined value, of the acquired color image with a predetermined constant value, and in the lane recognition apparatus, the lane mark detection image acquisition device acquires the color image, which is obtained by the replacement of the pixel values by the pixel value replacement device, as the lane mark detection image (Fifth aspect of the invention).

According to the lane recognition apparatus for the vehicle of the fifth aspect of the invention, the color image is smoothed by the filtering using the smoothing kernel having the size whose predetermined direction width is within the predetermined range greater than the predetermined direction width of the image portion of the lane mark. Therefore, if the kernel is placed with a center pixel set to a pixel included in an image portion of a lane mark or a local repaired part or shadow, the range of the kernel includes a large part of the image portion of the surrounding road surface. Therefore, in the smoothed color image, the pixel values of the pixels constituting the image portion of the local repaired part or shadow or the lane mark on the road are close to those of the pixels constituting the image portion of the surrounding road surface.

Moreover, the size of the image portion of the road surface is supposed to be larger than the image portion of the lane mark, and therefore if the kernel is placed with the center pixel set to the pixel in the image portion of the road surface, the range of the kernel includes a large part of the image portion of the road surface. Accordingly, the effect of the smoothing is small on the image portion of the road surface, and the pixel values in the color image that has not been smoothed yet are maintained in the smoothed color image.

Therefore, the change degree of the pixel value of the pixel of the acquired color image takes a positive great value in the image portion of the lane mark having a greater pixel value than the image portion of the road surface and takes a small value (including a negative value) in the image portion of the local repaired part or shadow having a smaller pixel value than the image portion of the road surface. Further, the change degree takes a small value also in the image portion of the road surface where the change in the pixel value is small before and after the smoothing. Therefore, the pixel replacement device replaces the pixel value of the pixel, whose change degree is equal to or less than the predetermined value, of the acquired color image with a predetermined constant value. Thereby, in the color image after the replacement, the pixel values of the pixels of the image portion of the road surface and of the image portion of the local repaired part or shadow are replaced with the constant values and only the pixel values of the pixels of the image portion of the lane mark are maintained.

Accordingly, the lane mark detection image acquisition device considers the region composed of the pixels whose pixel values are maintained (the pixel values are not replaced with the constant values) as the first image region and acquires the image after the replacement as the lane mark detection image. In the lane mark detection image, the image portions corresponding to the lane mark are appropriately identified as the first image region and therefore it is possible to recognize the lane accurately from the lane mark detection image.

Alternatively, preferably, the lane recognition apparatus for the vehicle of one of the first to fourth aspects of the invention further comprises: a kernel setting device which sets a kernel having a size whose predetermined direction width is within a predetermined range greater than the predetermined direction width of the image portion of the lane mark for the color image acquired via the imaging device; a smoothing device which acquires a luminance image having pixel values representing luminance and a saturation image having pixel values representing saturation, which are calculated from color components of the acquired color image and smoothes the luminance image and the saturation image by filtering using the smoothing kernel of the size set by the kernel setting device; a change degree calculation device which calculates a change degree of a pixel value of each pixel of the acquired luminance image to the luminance image smoothed by the smoothing device and a change degree of a pixel value of each pixel of the acquired saturation image to the saturation image smoothed by the smoothing device; and a pixel value replacement device which replaces a pixel value of a pixel, whose change degree calculated from the luminance image is equal to or less than a predetermined value and whose change degree calculated from the saturation image is equal to or less than a predetermined value, of the acquired color image with a predetermined constant value, and in the lane recognition apparatus, the lane mark detection image acquisition device acquires the color image, which is obtained by the replacement of the pixel values by the pixel value replacement device, as the lane mark detection image (Sixth aspect of the invention).

According to the lane recognition apparatus for the vehicle of the sixth aspect of the invention, it is thought that the image portion of a white lane mark has high luminance and the image portion of a yellow or other colored lane mark has high saturation. Therefore, the pixel value replacement device calculates the change degree of the pixel value before and after smoothing by performing the smoothing for the luminance image and the saturation image. The pixel value replacement device then replaces the pixel value of the pixel, whose change degree calculated from the luminance image is equal to or less than the predetermined value and whose change degree calculated from the saturation image is equal to or less than the predetermined value, of the acquired color image with a predetermined constant value. This enables the acquisition of the lane mark detection image applicable to the lane marks of various colors.

Further, in the lane recognition apparatus for the vehicle of one of the first to sixth aspects of the invention, preferably the equipment selects and outputs one of a plurality of types of information calling for attention to a driver of the vehicle and the vehicle equipment control device selects the information calling for attention output to the driver by using the equipment according to the recognition result of the lane recognition device (Seventh aspect of the invention).

According to the lane recognition apparatus for the vehicle of the seventh aspect of the invention, the vehicle equipment control device selects the information calling for attention output to the driver according to the recognition result of the lane recognition device, thereby enabling the lane recognition apparatus to perform the information presentation to the driver so as to cope with the possibility of the departure from the lane and to conform to the road rules.

Still further, in the lane recognition apparatus for the vehicle of one of the first to seventh aspects of the invention, preferably the equipment makes a change among a plurality of traveling controls of the vehicle and the vehicle equipment control device makes the change among the traveling controls of the vehicle by using the equipment according to the recognition result of the lane recognition device (Eighth aspect of the invention).

According to the lane recognition apparatus for the vehicle of the eighth aspect of the invention, the vehicle equipment control device changes the traveling control of the vehicle according to the recognition result of the lane recognition device, thereby enabling the lane recognition apparatus to perform the traveling controls of the vehicle so as to cope with the possibility of the departure from the lane and to conform to the road rules.

Subsequently, according to the present invention, there is provided a vehicle equipped with an imaging device and having a function of recognizing a lane along which the vehicle is traveling from a color image of a road acquired via the imaging device, comprising: a lane mark detection image acquisition device which acquires a lane mark detection image, which is divided into a first image region composed of pixels having pixel values supposed to be image portions of a lane mark defining the lane and a second image region composed of other pixels, from the color image of the road acquired via the imaging device; a clustering device which performs clustering in which the first image region of the lane mark detection image is divided into subregions each composed of adjacent pixels; a color determination device which determines a color of the subregions of the first image region obtained by the division in the clustering; a lane recognition device which performs line component extraction for each group, considering the subregions determined to have the same color by the color determination device as a single group, and recognizes a line position of the lane defined by the lane mark from the extracted line component; and a vehicle equipment control device which controls equipment of the vehicle according to a recognition result of the lane recognition device (Ninth aspect of the invention).

According to the ninth aspect of the vehicle, as has been described on the lane recognition apparatus for the vehicle of the first aspect of the invention, the lane mark detection image acquisition device acquires the lane mark detection image and the clustering device divides the first image region of the lane mark detection image into subregions each composed of adjacent pixels, thereby enabling the image portions of a single lane mark to be obtained as the subregions by common processing, independently of the lane mark type.

The color determination device determines the color of the subregions. Moreover, the lane recognition device performs the line component extraction for each group, considering the subregions determined to have the same color by the color determination device as a single group, and recognizes the lane from the extracted line component, thereby enabling the lane recognition apparatus to recognize the lane defined by the lane mark of each color with high accuracy by common processing. In this way, the lane marks of various colors and types are detected with high accuracy by the common processing and the lanes defined by the lane marks are appropriately recognized. Therefore, the vehicle equipment control device is capable of appropriately controlling the equipment of the vehicle so as to cope with the possibility of the departure from the lane and to conform to the road rules according to the recognition result of the lane recognition device, thereby enabling the traveling controls of the vehicle and the information presentation to the driver.

Subsequently, according to the present invention, there is provided a lane recognition program for a vehicle which causes a computer to recognize a lane along which a vehicle is traveling from a color image of a road acquired via an imaging device mounted on the vehicle, the program having functions of causing the computer to perform: lane mark detection image acquisition for acquiring a lane mark detection image, which is divided into a first image region composed of pixels having pixel values supposed to be image portions of a lane mark defining the lane and a second image region composed of other pixels, from the color image of the road acquired via the imaging device; clustering for dividing the first image region of the lane mark detection image into subregions each composed of adjacent pixels; color determination for determining a color of the subregions of the first image region obtained by the division in the clustering; lane recognition for performing line component extraction for each group, considering the subregions determined to have the same color by the color determination as a single group, and recognizing a line position of the lane defined by the lane mark from the extracted line component; and vehicle equipment control for controlling equipment of the vehicle according to a result of the lane recognition (Tenth aspect of the invention)

According to the lane recognition program for a vehicle of the tenth aspect of the invention, the program enables the computer to perform the processing capable of generating the effects described with respect to the first aspect of the invention.

DETAILED DESCRIPTION OF THE PREFERRED EMBODIMENTS

Figure 1:
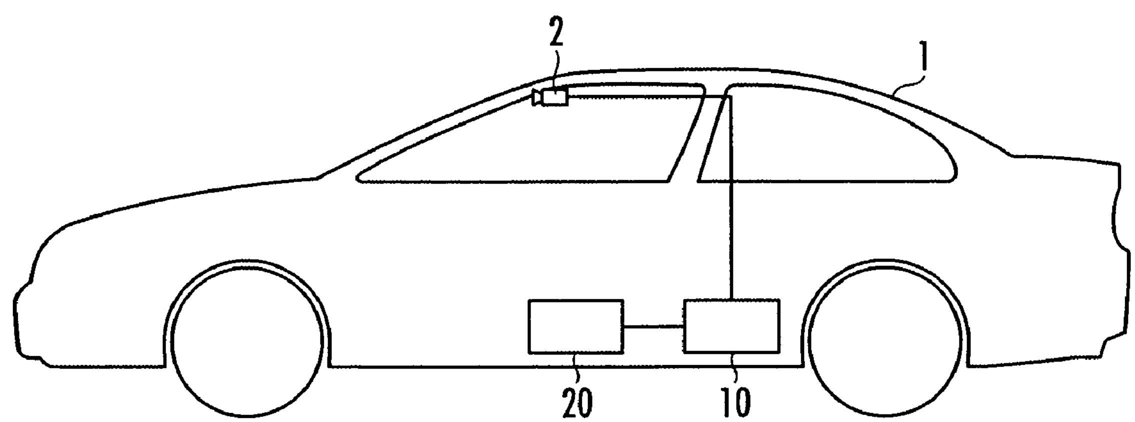
FIG. 1 is an explanatory diagram illustrating a mounting mode of a lane recognition apparatus for a vehicle according to the present invention onto a subject vehicle.

An embodiment of the present invention will now be described with reference to FIG. 1 to FIG. 9. Referring to FIG. 1, a lane recognition apparatus for a vehicle according to the embodiment of the present invention is mounted on a subject vehicle 1 (the vehicle of the present invention) when used and is composed of an image processing unit 10 and an electronic control unit (ECU) 2. The image processing unit 10 processes an image captured by a camera 2 which captures an image of the road ahead of the subject vehicle 1 and recognizes a lane defined by a lane mark on the road along which the subject vehicle 1 is traveling. The camera 2 (the imaging device of the present invention) is a CCD camera or the like, which is attached to the front of the subject vehicle 1. Data on the lane recognized by the image processing unit 10 is output to the ECU 20. The ECU 20 electrically controls the subject vehicle 1 in a comprehensive manner and assists the subject vehicle 1 in traveling along the lane by controlling a steering device of the subject vehicle 1 according to the input data on the lane.

Figure 2:
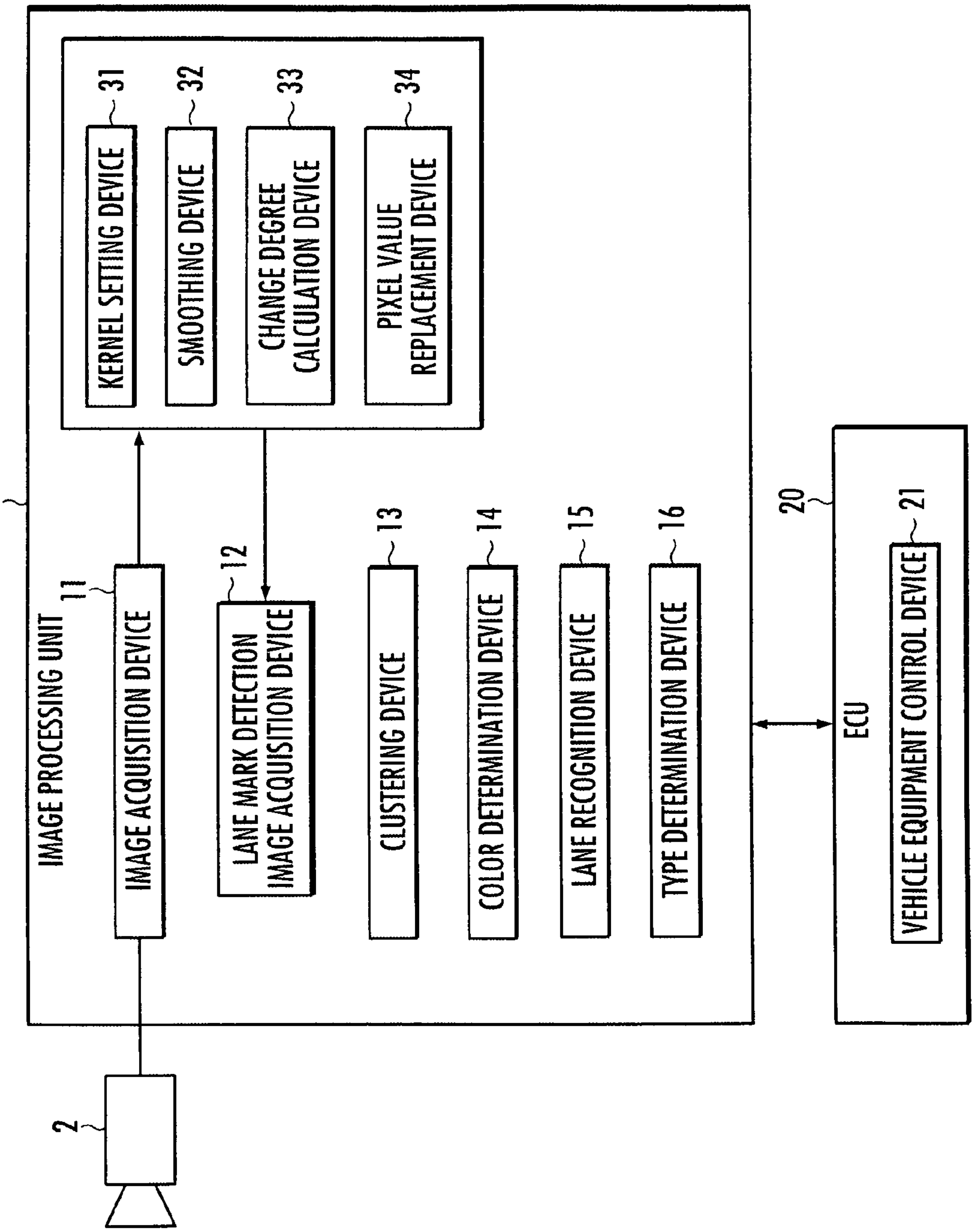
FIG. 2 is a block diagram of the lane recognition apparatus for the vehicle according to the present invention.

Subsequently, referring to FIG. 2, the image processing unit 10 includes, as its functions, an image acquisition device 11, a lane mark detection image acquisition device 12, a clustering device 13, a color determination device 14, a lane recognition device 15, and a type determination device 16 for use in recognizing the lane from a color image of the road ahead of the subject vehicle 1. Further, the image processing unit 10 includes a kernel setting device 31, a smoothing device 32, a change degree calculation device 33, and a pixel value replacement device 34 for use in processing the color image acquired by the image acquisition device 11 and outputting the processed image to the lane mark detection image acquisition device 12. The details of these functions will be described later.

Moreover, the ECU 20 includes, as its functions, a vehicle equipment control device 21 which controls the steering device of the subject vehicle 1 according to data on the recognized lane to perform lane keeping assistance. The steering device corresponds to the equipment of the present invention. Specifically, the vehicle equipment control device 21 generates a torque (a steering assist torque) by driving an actuator of the steering device (not shown) so that the subject vehicle 1 travels along the recognized lane.

The steering assist torque is transmitted to a steering wheel via a steering mechanism of the steering device along with a torque (driver steering torque) input by a driver's manual operation via a steering handle of the steering device of the subject vehicle 1. In this instance, the vehicle equipment control device 21 perform lane departure determination to determine whether the subject vehicle 1 is likely to depart from the lane (whether to perform the lane keeping assistance) on the basis of the lane line position of the recognized lane. If the subject vehicle 1 is likely to depart from the lane, the vehicle equipment control device 21 selects a control level on the basis of the color and shape of the lane mark defining the lane and performs the lane keeping assistance by generating a steering assist torque according to the control level.

The image processing unit 10 is an electronic unit composed of an A/D converter which converts an input analog signal to a digital signal, an image memory which stores the digitized image signal, a computer (a CPU, a memory, an arithmetic processing circuit including I/O circuits, or a microcomputer having all of these functions) which has an interface circuit for use in accessing (reading and writing) data stored in the image memory to perform various types of arithmetic processing for the images stored in the image memory, and the like.

Moreover, the ECU 20 is also an electronic unit composed of a computer (a CPU, a memory, an arithmetic processing circuit including I/O circuits, or a microcomputer having all of these functions) which performs various types of arithmetic processing.

The computer of the image processing unit 10 is caused to execute a lane recognition program according to the present invention, thereby enabling the computer to function as the image acquisition device 11, the lane mark detection image acquisition device 12, the clustering device 13, the color determination device 14, the lane recognition device 15, the type determination device 16, the kernel setting device 31, the smoothing device 32, the change degree calculation device 33, and the pixel value replacement device 34. Moreover, the computer of the ECU 20 is caused to execute the lane recognition program according to the present invention, thereby enabling the computer to function as the vehicle equipment control device 21.

Subsequently, lane recognition performed by the lane recognition apparatus for the vehicle will be described with reference to the flowchart shown in FIG. 3. The processing of the flowchart shown in FIG. 3 is repeated for each control cycle of the lane recognition apparatus for the vehicle.

Figure 3:
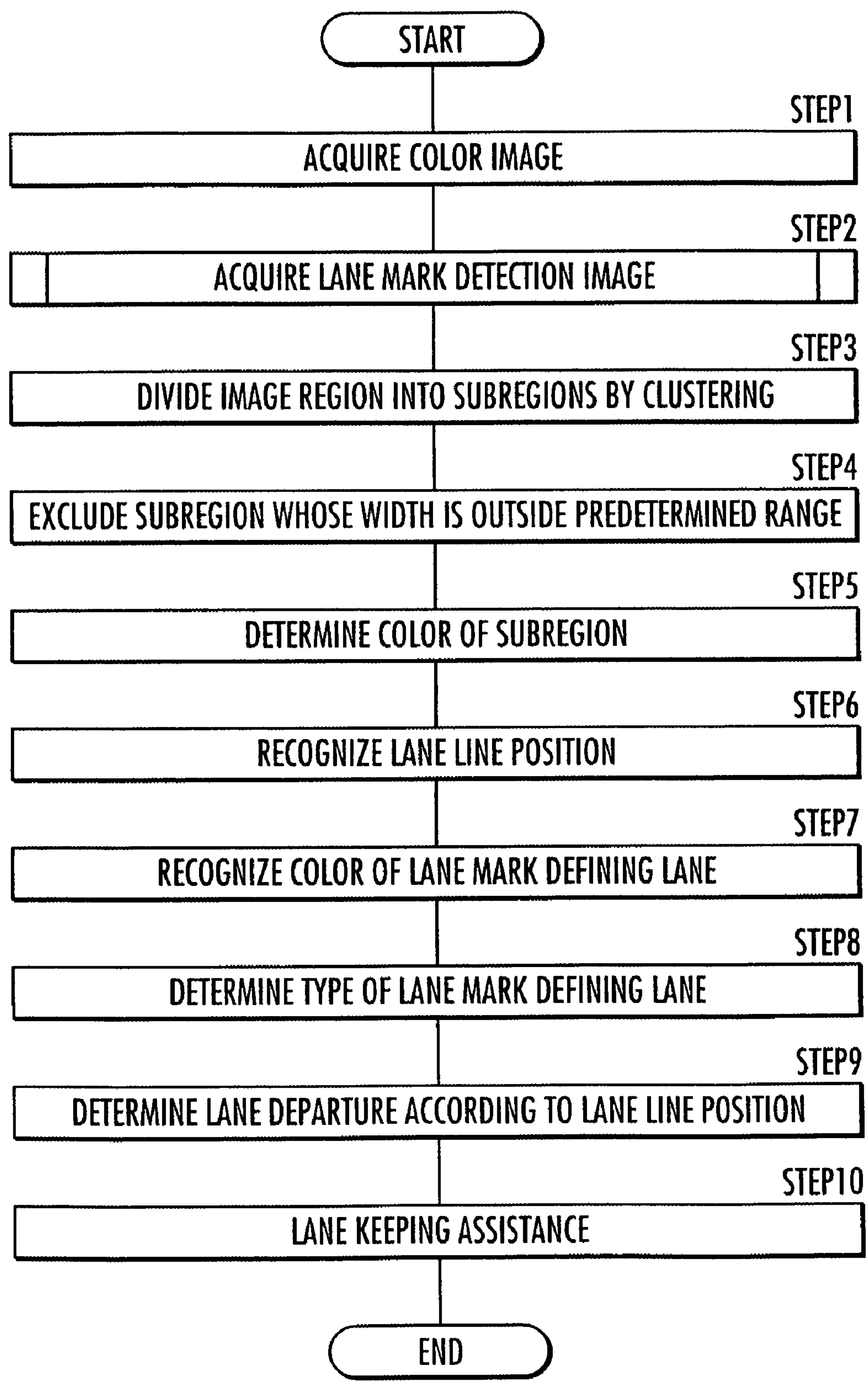
FIG. 3 is a flowchart illustrating lane recognition for the vehicle performed by the lane recognition apparatus for the vehicle shown in FIG. 2.

In step 1 of FIG. 3, the image acquisition device 11 inputs an image signal output from the camera 2 to acquire a color image composed of pixel data. The pixel data of the color image is composed of color components of R, G, and B values. The acquired color image is A/D-converted and is stored into the image memory.

Figure 5:
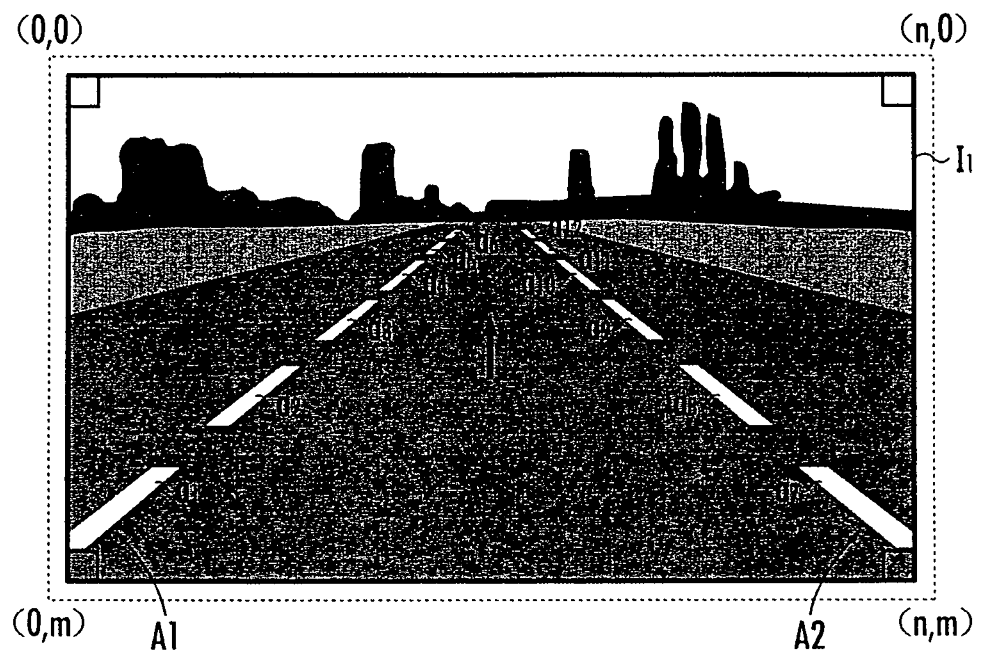
FIG. 5 is a diagram illustrating examples of a processed image and an explanatory diagram of the lane recognition for the vehicle shown in FIG. 3.
Figure 5:
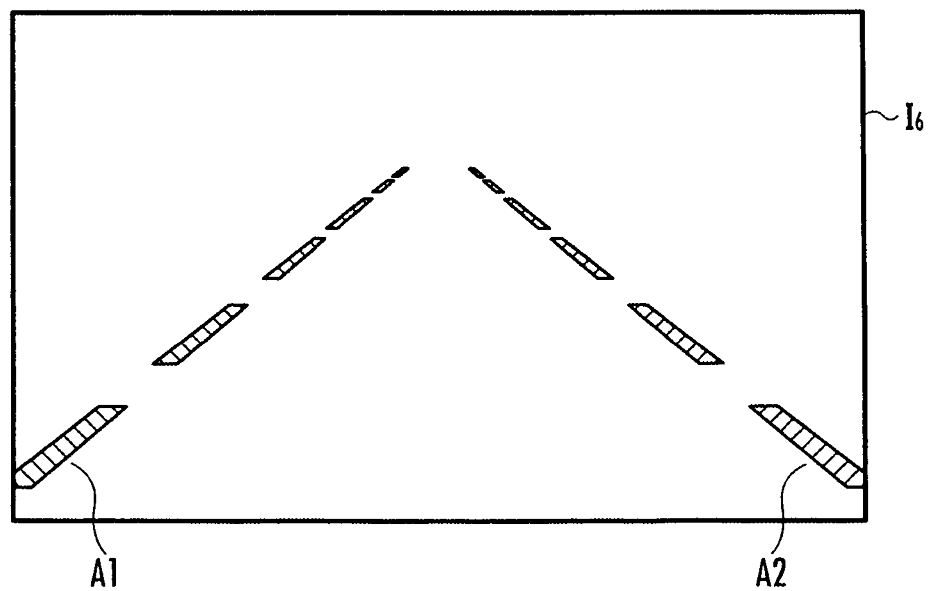
Figure 6A:
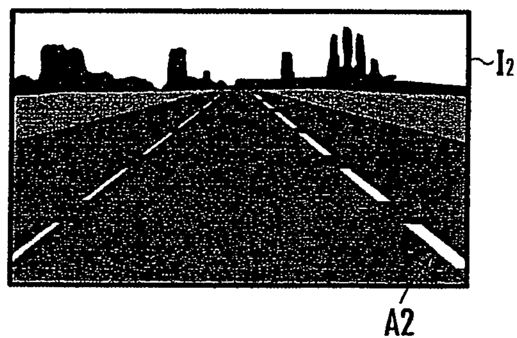
FIG. 6 is a diagram illustrating examples of a processed image and an explanatory diagram of the acquisition of the lane mark detection image shown in FIG. 4.
Figure 6B:
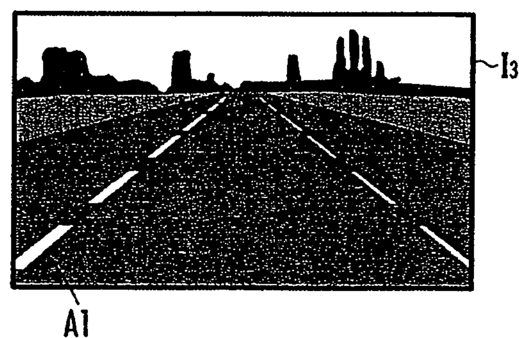
Figure 6C:
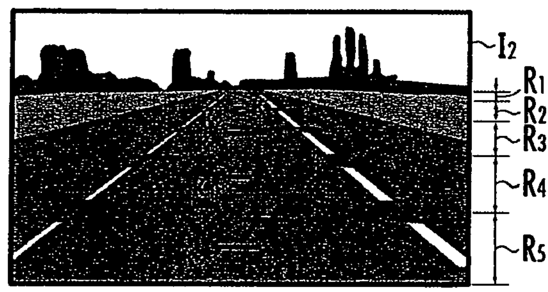
Figure 6D:
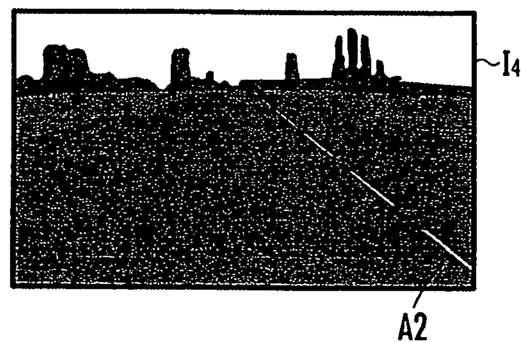
Figure 6E:
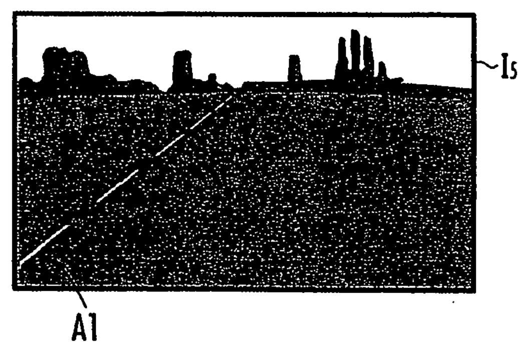

FIG. 5(*a*) illustrates a color image $I_1$ acquired via the camera 2 at a given time of a control cycle. The color image $I_1$ is composed of m×n pixels. Each pixel $P_1$ of the color image $I_1$ has data of R, G, and B values as color components and is expressed by $P_1(i, j)=(R_{ij}, G_{ij}, B_{ij})$, where i and j are the coordinates of each pixel and integers satisfying $0 \leqq i<m$ and $0 \leqq j<n$, respectively.

The example shown in FIG. 5(*a*) shows a situation where the subject vehicle 1 is traveling in the direction of arrow in the case where the lane mark defining the left side of the lane on the road along which the subject vehicle 1 is traveling is a broken yellow line A1 (composed of lane marks a1 to a6) and the lane mark defining the right side of the lane is a broken white line A2 (composed of lane marks a7 to a12).

Next, in step 2, the lane mark detection image acquisition device 12 acquires a lane mark detection image, which is divided into a first image region composed of pixels having pixel values supposed to be image portions of the lane mark defining the lane and a second image region composed of other pixels, from the color image of the road acquired in step 1. The processing of acquiring the lane mark detection image is performed according to the flowchart shown in FIG. 4.

Figure 4:
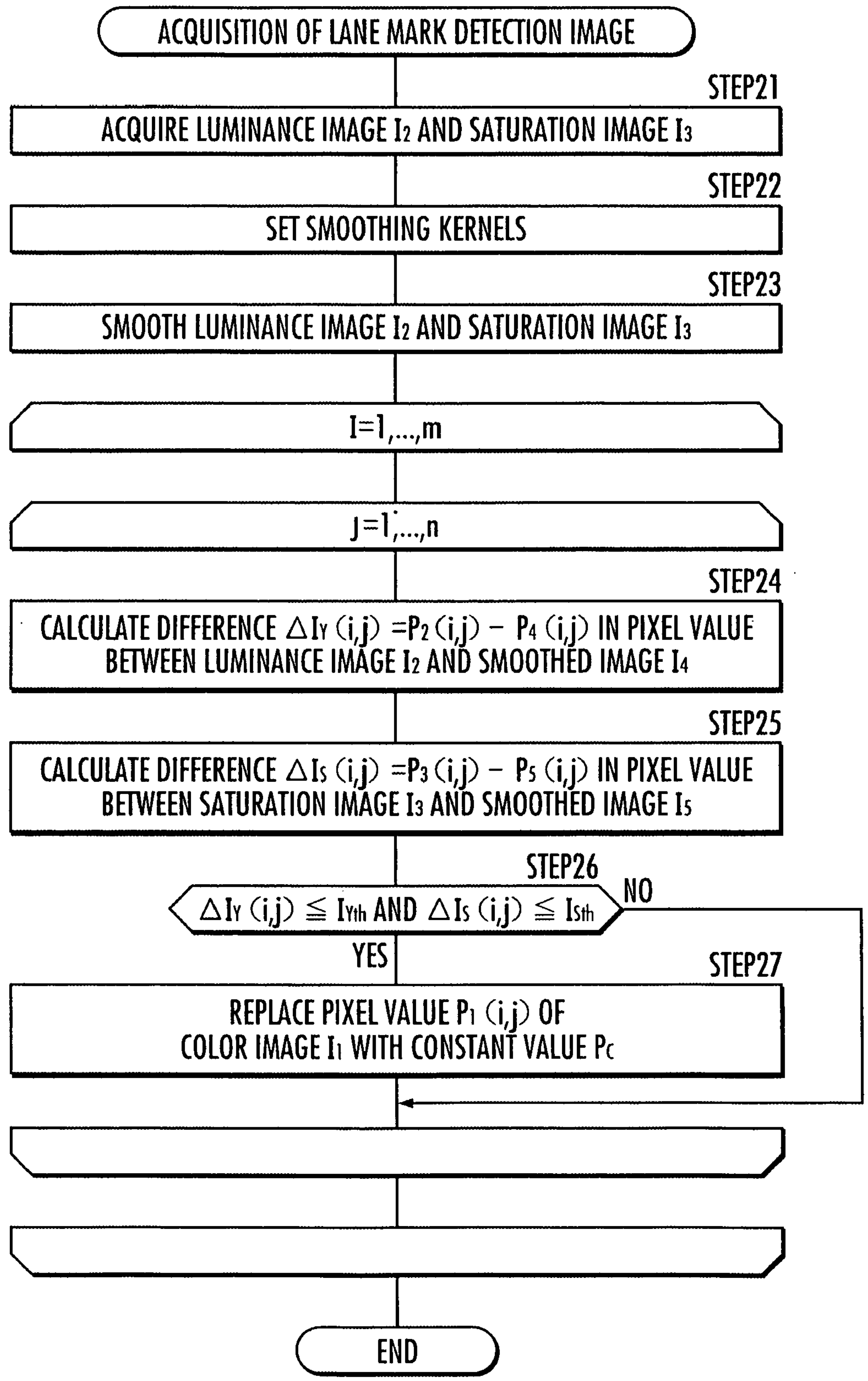
FIG. 4 is a flowchart illustrating acquisition of a lane mark detection image in the lane recognition for the vehicle of FIG. 3.

Referring to FIG. 4, in step 21, the smoothing device 32 calculates the luminance Y of pixels from the color components (R, G, B) of each pixel of the color image $I_1$ acquired in step 1 to acquire a luminance image $I_2$ having pixel values representing the luminance Y, and further calculates the saturation S of pixels to acquire a saturation image $I_3$ having pixel values representing the saturation S.

More specifically, the smoothing device 32 calculates luminance $Y_{ij}$ by $Y_{ij}=\alpha \times R_{ij}+\beta \times G_{ij}+\gamma \times B_{ij}$, from the color components $(R_{ij}, G_{ij}, B_{ij})$ of each pixel $P_1(i, j)$ of the color image $I_1$, where α, β, and γ are predetermined coefficients satisfying $\alpha+\beta+\gamma=1$. This enables the acquisition of a luminance image $I_2$ composed of m×n pixels and having the luminance $Y_{ij}$ as data of each pixel $P_2(i, j)$, as shown in FIG. 6(*a*).

It is also possible for the image acquisition device 11 to calculate the luminance $Y_{ij}$ by $Y_{ij}=(MAX_{ij}+MIN_{ij})/2$ by using the maximum value $MAX_{ij}$ and the minimum value $MIN_{ij}$ of $(R_{ij}, G_{ij}, B_{ij})$. Alternatively, the smoothing device 32 may use the $G_{ij}$ value as the luminance $Y_{ij}$. As shown in FIG. 6(*a*), in the luminance image $I_2$, the image portions of the white line A2 have high luminance and the image portions of the yellow line A1 have lower luminance than the white line A2. Moreover, the image portions of the road surface have still lower luminance and have average road surface luminance.

In addition, the smoothing device 32 calculates saturation $S_{ij}$ by $S_{ij}=(MAX_{ij}-(MIN_{ij})/MAX_{ij}$ from the R, G, and B values $(R_{ij}, G_{ij}, B_{ij})$ of each pixel $P_1(i, j)$ of the color image $I_1$. This allows an acquisition of the saturation image $I_3$ composed of m×n pixels and having the saturation $S_{ij}$ as data of each pixel $P_3(i, j)$ as shown in FIG. 6(*b*). As shown in FIG. 6(*b*), in the saturation image $I_3$, the image portions of the yellow line A1 have high saturation and the image portions of the white line A2 have lower saturation than the yellow line A1. Moreover, the image portions of the road surface have still lower saturation and have average road surface saturation.

Next in step 22, the kernel setting device 31 sets smoothing kernels of a plurality of sizes for the luminance image $I_2$ and the saturation image $I_3$ acquired in step 21. In this instance, the kernel setting device 31 sets each kernel whose predetermined direction width is within a predetermined range greater than the predetermined direction width of each lane mark image portion.

FIG. 6(*c*) illustrates five smoothing kernels $K_1$ to $K_5$ set for the luminance image $I_2$. Also for the saturation image $I_3$, the smoothing kernels $K_1$ to $K_5$ are set similarly to the luminance image $I_2$. The smoothing kernels $K_1$ to $K_5$ are used for smoothing with a center pixel set to a pixel included in each of regions $R_1$ to $R_5$ of the luminance image $I_2$.

It is assumed that the smoothing kernels $K_1$ to $K_5$ each have a vertical size $Y_f$ [pixels] of several pixels (for example, one to three [pixels]). Regarding the regions $R_1$ to $R_5$, the vertical width gradually decreases as the region is farther away from the subject vehicle 1. The size $Y_f$ may be a value that decreases as the distance from the subject vehicle 1 increases.

Moreover, it is assumed that the smoothing kernels $K_1$ to $K_5$ each have a horizontal size $X_f$ [pixels] of a value corresponding to a predetermined width ΔX in a real space. The predetermined width ΔX may be a value greater than a value supposed to be a lane mark width (for example, 0.1 to 0.75 [m]) (for example, the width ΔX may be several times the lane mark width, and more specifically 0.5 to 1 µl).

It is assumed that the predetermined value ΔX is smaller than a value supposed to be a road width. The horizontal sizes $X_f$ of the smoothing kernels $K_1$ to $K_5$ are, for example, 10, 20, 50, 100, and 150 [pixels], respectively. The size $X_f$ is set to a value that decreases as the distance from the subject vehicle 1 increases on the basis of a relationship between the real space coordinate system and the image coordinate system of the subject vehicle 1 (determined according to the mounting position, the focal length, the pel spacing, or the like of the camera 2).

Returning to FIG. 4, in the next step 23, the smoothing device 32 smoothes the luminance image $I_2$ and the saturation image $I_3$ by filtering using the smoothing kernels $K_1$ to $K_5$ set in step 22. In the smoothing, the smoothing kernel is set with an appropriate pixel as the center pixel and the average of the pixel values of all pixels included in the range of the smoothing kernel is determined to be a pixel value of the center pixel, with respect to the pixels in the image.

FIG. 6(*d*) shows a luminance image $I_4$ after the smoothing. The smoothing causes less variation in terms of pixel value in the luminance image $I_2$ so as to achieve a low-contrast image. In the luminance image $I_4$ after the smoothing, the pixel values of the image portions of the white line A2 are also close to the average road surface luminance.

FIG. 6(*e*) shows a saturation image $I_5$ after the smoothing. The smoothing causes less variation in terms of pixel value in the saturation image $I_3$ so as to achieve a low-contrast image. In the saturation image $I_5$ after the smoothing, the pixel values of the image portions of the yellow line A1 are also close to the average road surface saturation.

Subsequently, steps 24 to 27 are performed for all pixels (i=1 to m, j=1 to n) of the color image $I_1$.

First, in step 24, the change degree calculation device 33 calculates a luminance change degree $\Delta I_Y(i, j)=P_2(i, j)-P_4(i, j)$ of the pixel (i, j) by subtracting the pixel value $P_4(i, j)$ of the luminance image $I_4$ after the smoothing of step 23 from the pixel value $P_2(i, j)$ of the luminance image $I_2$ acquired in step 22.

Then, in step 25, the change degree calculation device 33 calculates a saturation change degree $\Delta I_S(i, j)=P_3(i, j)-P_5(i, j)$ of the pixel (i, j) by subtracting the pixel value $P_5(i, j)$ of the saturation image $I_5$ after the smoothing of step 23 from the pixel value $P_3(i, j)$ of the saturation image $I_3$ acquired in step 22.

Next, in step 26, the pixel value replacement device 34 determines whether the luminance change degree $\Delta I_Y(i, j)$ is equal to or less than a predetermined value $I_{Yth}$ and the saturation change degree $\Delta I_S(i, j)$ is equal to or less than a predetermined value $I_{Sth}$. The predetermined value $I_{Yth}$ is a value (for example, zero or less value) that is determined according to a possible range for the luminance change degree of the image portions of the lane mark (white line). Moreover, the predetermined value $I_{Sth}$ is a value (for example, zero or less value) that is determined according to a possible range for the saturation change degree of the image portions of the lane mark (yellow line).

If the determination result of step 26 is YES, it is supposed that the image portions correspond to those having a low luminance change degree $\Delta I_Y(i, j)$ of the pixel (i, j) and a low saturation change degree $\Delta I_S(i, j)$ thereof, in other words, the image portions correspond to those in which the luminance and saturation change moderately before and after the smoothing. Therefore, the control proceeds to step 27, where the pixel value replacement device 34 replaces the pixel value $P_1(i, j)$ of the color image $I_1$ with a predetermined constant value $P_c$ and then the control returns to step 5. The constant value $P_c$ is, for example, a value sufficiently smaller than a possible value of a pixel value of the image portions of the lane mark (for example, (0, 0, 0)).

On the other hand, if the determination result of step 26 is NO, it is supposed that the image portions correspond to those of the white line A2 having high luminance of the pixel (i, j) or those of the yellow line A1 having high saturation. Therefore, the pixel value replacement device 34 omits the replacement of the pixel value of the pixel (i, j) and the control directly returns to step 25.

The lane mark detection image acquisition device 12 acquires a color image after the pixel value replacement, which is acquired as a result of the execution of the processing of steps 24 to 26 with respect to all pixels of the color image $I_1$, as a lane mark detection image $I_6$. The acquired lane mark detection image $I_6$ is shown in FIG. 5(*b*). In FIG. 5(*b*), the hatched region is composed of pixels having the pixel values of the color image $I_1$ as they are and corresponds to the first image region.

Moreover, the white space other than the first region is composed of pixels having pixel values replaced with constant values and corresponds to the second image region. As shown in FIG. 5(*b*), in the color image after the pixel value replacement, only the image portions of the yellow line A1 and the white line A2 are maintained with the pixel values of the color image $I_1$ as they are. Therefore, it is possible to consider these areas as the first image region composed of pixels having pixel values, which are supposed to be the image portions of the lane mark defining the lane.

Figure 7:
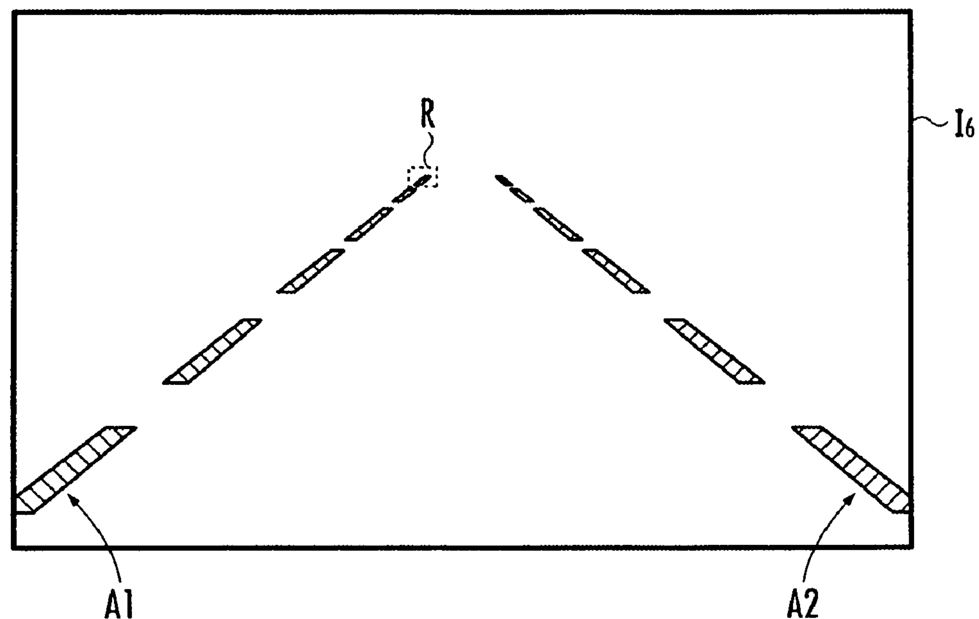
FIG. 7 is an explanatory diagram of clustering in the lane recognition for the vehicle shown in FIG. 3.
Figure 7:
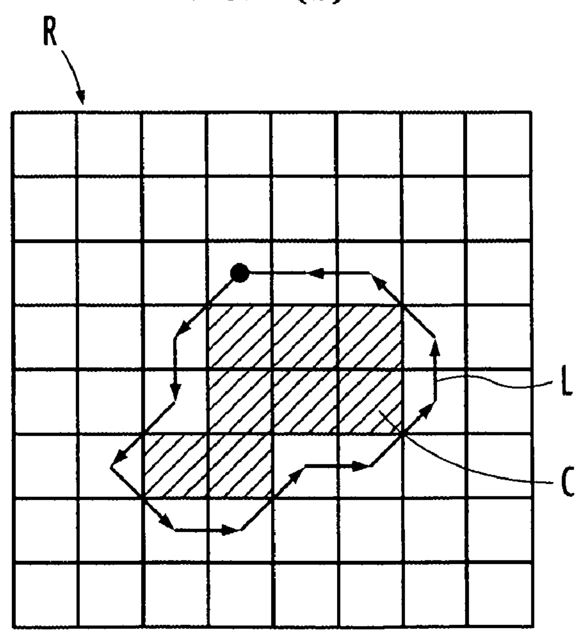
Figure 8:
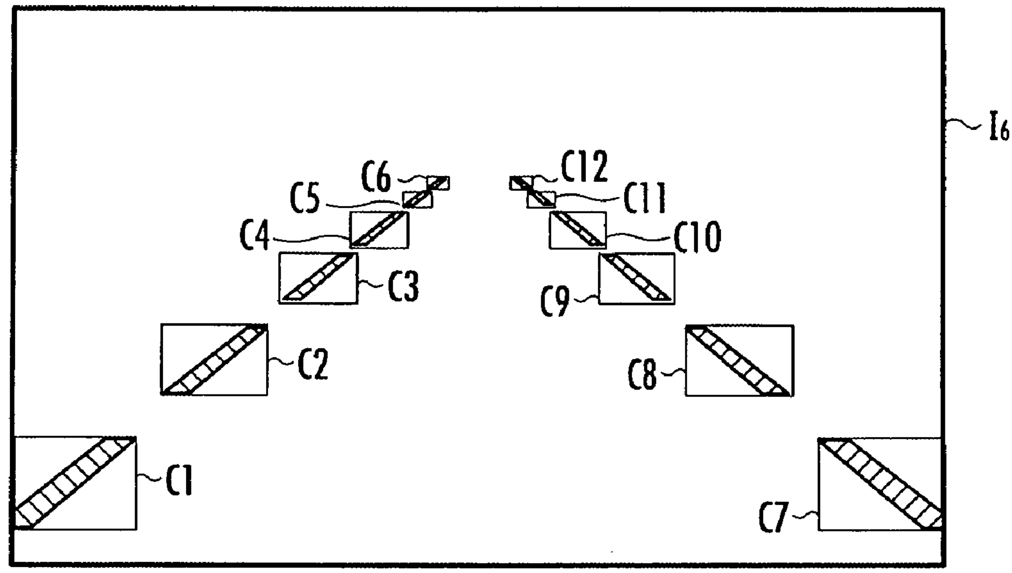
FIG. 8 is an explanatory diagram of line component extraction in the lane recognition for the vehicle shown in FIG. 3.
Figure 8:
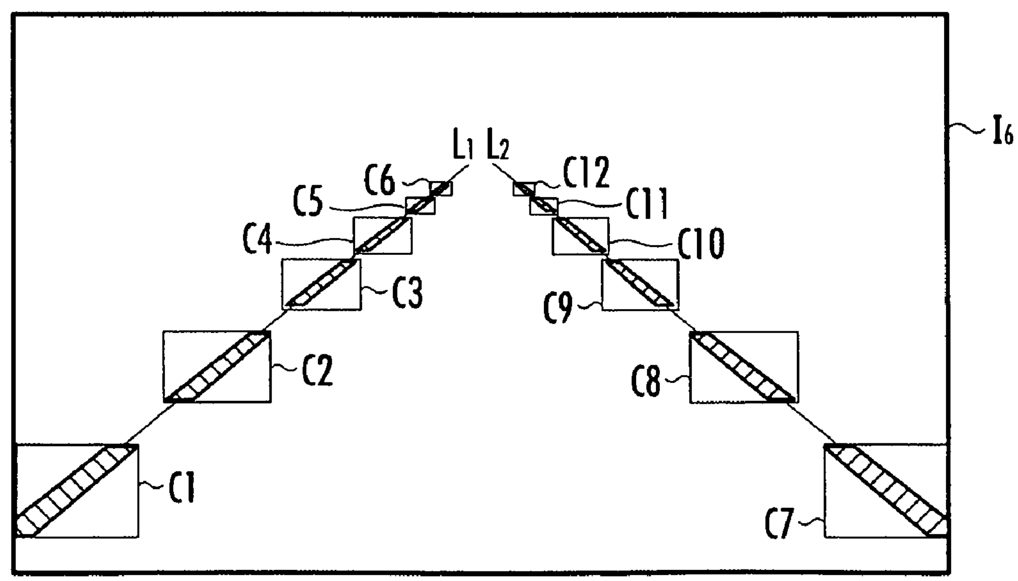

Returning to FIG. 3, subsequently in step 3, the clustering device 13 performs clustering for dividing the first image region of the lane mark detection image acquired in step 2 into subregions each composed of adjacent pixels. More specifically, the clustering device 13 performs edge following for the first image region of the lane mark detection image $I_6$ and considers a closed region enclosed by an edge to be a subregion. For example, regarding a region R shown in FIG. 7(*a*), an edge is followed as shown in FIG. 7(*b*) and a closed region enclosed by an edge L is considered as a subregion C. The clustering causes the first image region of the lane mark detection image $I_6$ into subregions $C_1$ to $C_{12}$ as shown in FIG. 8(*a*).

Figure 9:
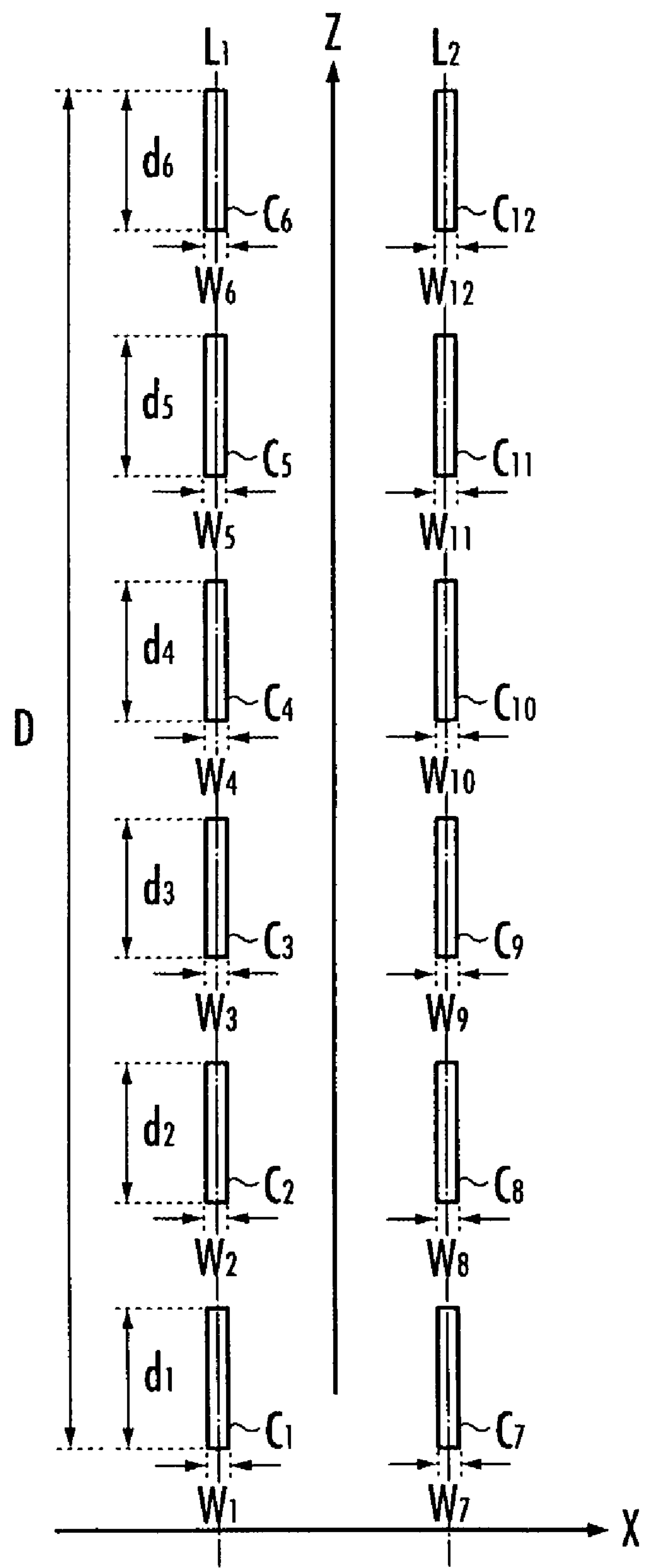
FIG. 9 is an explanatory diagram of subregions in a real space in the lane recognition for the vehicle shown in FIG. 3.

Next, in step 4, the lane recognition device 15 excludes subregions whose predetermined direction widths are outside a predetermined range set according to the width of the lane mark corresponding to the predetermined direction from processing objects, among the subregions $C_1$ to $C_{12}$ acquired in step 3. More specifically, the lane recognition device 15 converts the subregions $C_1$ to $C_{12}$ to those in the real space coordinate system by using the relationship between the real space coordinate system and the image coordinate system of the subject vehicle 1. FIG. 9 illustrates the subregions $C_1$ to $C_{12}$ in the real space.

Subsequently, the lane recognition device 15 determines whether widths $W_1$ to $W_{12}$ of the subregions $C_1$ to $C_{12}$ in the real space are each outside the range of $W_{th1}$ to $W_{th2}$ (for example, 0.05 to 1 [m]) set according to the width of the lane mark in the real space. Then, if determined to be outside the range of $W_{th1}$ to $W_{th2}$, the subregions are supposed to be other than the image portions of the lane mark, and therefore the lane recognition device 15 excludes the subregions from the subsequent processing objects. In the example shown in FIG. 9, all of the widths $W_1$ to $W_{12}$ of the subregions $C_1$ to $C_{12}$ are determined to be within the range of $W_{th1}$ to $W_{th2}$ and all of the subregions are considered to be processing objects.

Next, in step 5, the color determination device 14 determines the color of the subregions of the first image region obtained by the clustering. More specifically, the color determination device 14 performs voting to vote a predetermined color (for example, classified into white, yellow, or others [blue, red, or green]) for each pixel with respect to each subregion and determines the color of each subregion. In the example shown in FIG. 8(*a*), the subregions $C_1$ to $C_6$ are determined to be yellow in color and the subregions $C_7$ to $C_{12}$ are determined to be white in color.

Next, in step 6, the lane recognition device 15 performs line component extraction for each group, considering the subregions determined to have the same color in step 5 as a single group, and recognizes a line position of the lane defined by the lane mark from the extracted line component. The technique of extracting the line components may be a Hough transform, line fitting using a least squares method, or the like.

Thereafter, the lane recognition device 15 recognizes the line position of the lane on the basis of the extracted line components and the positional relationship between the line components and the subject vehicle 1. In the example shown in FIG. 8(*a*), a line component L1 is extracted from the group composed of the subregions $C_1$ to $C_6$ and a line component L2 is extracted from the group composed of the subregions $C_7$ to $C_{12}$ as shown in FIG. 8(*b*). The lane recognition device 15 then recognizes the extracted line components L1 and L2 as the left and right lane line positions in the image and converts the line components L1 and L2 to those in the real space coordinate system to acquire the lane line positions in the real space.

Next, in step 7, the lane recognition device 15 recognizes the color of the lane mark defining the lane. More specifically, the lane recognition device 15 recognizes the color of the subregions constituting the group from which the line component is extracted as the color of the lane mark defining the lane recognized from the line component. Specifically, in the example shown in FIG. 8(*b*), the lane recognition device 15 recognizes the color (yellow) determined in step 5, with respect to the subregions $C_1$ to $C_6$ constituting the group from which the line component L1 is extracted as the color of the lane mark defining the lane recognized from the line component L1. Moreover, the lane recognition device 15 recognizes the color (white) determined in step 5 as the color of the lane mark defining the lane recognized from the line component L2, with respect to the subregions $C_7$ to $C_{12}$ constituting the group from which the line component L2 is extracted.

Subsequently, in step 8, the type determination device 16 determines the type of the lane mark defining the recognized lane. In this instance, the type determination device 16 determines the type of the lane mark defining the lane recognized from the line component on the basis of the distribution state of the subregions in the vicinity of the line component, which constitute the group from which the line component is extracted. More specifically, as shown in FIG. 9, the type determination device 16 calculates the ratio between the length D of a line segment from the nearest place to the subject vehicle 1 to the farthest place from the subject vehicle 1 of the subregions $C_1$ to $C_6$ in the line component L1 and the total sum of the lengths $d_1$ to $d_6$ of the subregions $C_1$ to $C_6$ $((d_1+d_2+d_3+d_4+d_5+d_6)/D)$.

If the calculated ratio is equal to or greater than a predetermined value $D_{th}$, the type determination device 16 determines the type of the lane mark defining the lane recognized from the line component L1 to be a solid line. If the ratio is less than the predetermined value $D_{th}$, the type determination device 16 determines the type of the lane mark to be a broken line. The same applies to the line component L2. In the example shown in FIG. 9, the line components L1 and L2 are determined to be broken lines, respectively.

Next, in step 9, the vehicle equipment control device 21 performs the lane departure determination on the basis of the data on the recognized lane. More specifically, the vehicle equipment control device 21 determines whether the subject vehicle 1 is likely to depart from the recognized lane on the basis of the line position of the recognized lane, the current position of the subject vehicle 1, the vehicle speed, and the like. If the subject vehicle 1 is likely to depart from the lane, the vehicle equipment control device 21 determines that the lane keeping assistance should be performed.

Subsequently, in step 10, the vehicle equipment control device 21 performs the lane keeping assistance on the basis of the data on the recognized lane if determining that the lane keeping assistance should be performed in step 9. More specifically, the vehicle equipment control device 21 sets a target yaw rate so that the subject vehicle 1 travels along the recognized lane on the basis of the line position of the recognized lane, the current position of the subject vehicle 1, the vehicle speed, and the like. Thereafter, in order to eliminate a difference between the target yaw rate and the output from a yaw rate sensor provided in the subject vehicle 1, the vehicle equipment control device 21 calculates a steering assist torque and causes the actuator of the steering device to generate the calculated steering assist torque.

In this process, the vehicle equipment control device 21 changes the control of the steering device according to the color and type of the lane mark defining the recognized lane. More specifically, the vehicle equipment control device 21 changes the control level of the lane keeping assistance by changing the magnitude of a preset controlled variable (the target yaw rate) according to the meanings in the road rules determined from the color and type of the lane mark. This enables the traveling control of the subject vehicle 1 performed by assist-driving the steering device of the subject vehicle 1 so as to cope with the possibility of the departure from the lane and to conform to the road rules.

For example, according to the road rules in Japan, if the lane mark defining the lane is a solid white line, it device no crossing the line; if the lane mark is a yellow line, it device no passing on the right-hand portion of the road; and if the lane mark is a broken white line, it device crossing the line permitted. Therefore, if determining that the subject vehicle 1 is likely to depart from the lane, the vehicle equipment control device 21 performs: the lane keeping assistance at the highest control level 1 in the case of the solid white line lane; the lane keeping assistance at the middle control level 2 in the case of the yellow line lane; and the lane keeping assistance at the lowest control level 3 in the case of the broken white line lane.

Further, for example, according to the road rules in the US, if the lane mark defining the lane is a solid white or yellow line, it device no crossing the line; if the lane mark is a broken yellow line, it device no passing on the left-hand portion of the road; and if the lane mark is a broken white line, it device crossing the line permitted. Therefore, if determining that the subject vehicle 1 is likely to depart from the lane, the vehicle equipment control device 21 performs: the lane keeping assistance at the highest control level 1 in the case of the solid white or yellow line lane; the lane keeping assistance at the middle control level 2 in the case of the broken yellow line lane; and the lane keeping assistance at the lowest control level 3 in the case of the broken white line lane.

The above-described is the lane recognition for the vehicle in the lane recognition apparatus for the vehicle according to this embodiment. According to this embodiment, it is possible to recognize the lane from the color image of the road along which the subject vehicle 1 is traveling by distinguishing between the lane marks A1 and A2 of various colors and types. Additionally, it is possible to recognize the colors and types of the lane marks A1 and A2 defining the lanes with high accuracy along with the lane line positions and to perform traveling controls of the subject vehicle 1 on the basis of the recognition result.

While the vehicle equipment control device 21 changes the control level of the lane keeping assistance according to the color and type of the lane mark defining the lane in this embodiment, it is alternatively possible to change the level of criterion of the lane departure determination in another embodiment.

Further, while the vehicle equipment control device 21 controls the steering device as the equipment of the present invention in the lane keeping assistance in this embodiment, it is alternatively possible to control (assist-drive) a braking device or an acceleration device of the subject vehicle 1 in another embodiment.

Moreover, the vehicle equipment control device 21 may control a speaker or a display device mounted as equipment on the subject vehicle 1, and in the case where the subject vehicle 1 is likely to depart from the lane, the vehicle equipment control device 21 may perform calling attention output processing for selecting and outputting one of a plurality of types of information calling for attention to a driver of the subject vehicle 1 via the speaker or the display device.

In this instance, the vehicle equipment control device 21 selects the information calling for attention to be output according to the data on the recognized lane. This enables the equipment of the subject vehicle 1 to be controlled so as to cope with the possibility of the departure from the lane and to conform to the road rules to present information to the driver appropriately. Moreover, the vehicle equipment control device 21 may perform the lane keeping assistance and the calling attention output processing in parallel.

While the change degree calculation device 33 uses the difference between pixel values as the change degree in this embodiment, it is alternatively possible to use the ratio between pixel values of pixels, which is obtained by dividing an acquired image by a smoothed image, as the change degree in another embodiment ($\Delta I_Y(i, j)=P_2(i, j)/P_4(i, j)$, $\Delta I_S(i, j)=P_3(i, j)/P_5(i, j)$). In this case, the predetermined values $I_{Yth}$ and $I_{Sth}$ are assumed to be values determined according to a possible range for the change degree of the pixel values of the image portions of the lane mark (for example, 1 or smaller values).

Moreover, while the image acquisition device 11 acquires a color image whose pixel data is composed of color components of R, G, and B values in this embodiment, it is alternatively possible to acquire a color image whose pixel data is composed of color components of CMY output values or the like.

Further, while the lane mark detection image acquisition device 12 acquires a lane mark detection image by performing the smoothing and the pixel value replacement for each of the luminance image and the saturation image, it is alternatively possible to acquire the lane mark detection image by performing the smoothing and the pixel value replacement after acquiring an image whose pixel values represent one of luminance and saturation or represent others.

Still further, while the lane mark detection image acquisition device 12 acquires a lane mark detection image by performing the smoothing and the pixel value replacement for the color image in this embodiment, it is alternatively possible to acquire a lane mark detection image by dividing the color image into a first image region and a second image region by using any other technique.

What is claimed is:

1. A lane recognition apparatus for a vehicle which recognizes a lane along which a vehicle is traveling from a color image of a road acquired via an imaging device mounted on the vehicle, comprising:

a lane mark detection image acquisition device which acquires a lane mark detection image, which is divided into a first image region composed of pixels having pixel values supposed to be image portions of a lane mark defining the lane and a second image region composed of other pixels, from the color image of the road acquired via the imaging device;

a clustering device which performs clustering in which the first image region of the lane mark detection image is divided into subregions each composed of adjacent pixels;

a color determination device which determines a color of the subregions of the first image region obtained by the division in the clustering;

a lane recognition device which performs line component extraction for each group, considering the subregions determined to have the same color by the color determination device as a single group, and recognizes a line position of the lane defined by the lane mark from the extracted line component;

a type determination device which determines the type of the lane mark defining the lane recognized from the line component on the basis of a distribution state of the subregions, which exist in the vicinity of the line component, constituting the group from which the line component is extracted; and a vehicle equipment control device which controls equipment of the vehicle according to a recognition result of the lane recognition device, wherein the vehicle equipment control device controls the equipment of the vehicle at least according to the line position of the lane recognized by the lane recognition device and the type of the lane mark defining the lane.

2. The lane recognition apparatus according to claim 1, wherein:

the lane recognition device recognizes the color of the subregions constituting the group from which the line component is extracted as the color of the lane mark defining the lane recognized from the line component; and the vehicle equipment control device controls the equipment of the vehicle at least according to the line position of the lane recognized by the lane recognition device and the color of the lane mark defining the lane.

3. The lane recognition apparatus according to claim 1, wherein the lane recognition device excludes a subregion whose predetermined direction width is outside a predetermined range set according to the width of the lane mark corresponding to the predetermined direction from an object of the line component extraction among the subregions.

4. The lane recognition apparatus according to claim 1, further comprising:

a kernel setting device which sets a kernel having a size whose predetermined direction width is within a predetermined range greater than the predetermined direction width of the image portion of the lane mark for the color image acquired via the imaging device;

a smoothing device which smoothes the acquired color image by filtering using the smoothing kernel of the size set by the kernel setting device;

a change degree calculation device which calculates a change degree of a pixel value of each pixel of the acquired color image for the color image smoothed by the smoothing device; and a pixel value replacement device which replaces a pixel value of a pixel, whose change degree is equal to or less than a predetermined value, of the acquired color image with a predetermined constant value, wherein the lane mark detection image acquisition device acquires the color image, which is obtained by the replacement of the pixel values by the pixel value replacement device, as the lane mark detection image.

5. The lane recognition apparatus according to claim 1, further comprising:

a kernel setting device which sets a kernel having a size whose predetermined direction width is within a predetermined range greater than the predetermined direction width of the image portion of the lane mark for the color image acquired via the imaging device;

a smoothing device which acquires a luminance image having pixel values representing luminance and a saturation image having pixel values representing saturation, which are calculated from color components of the acquired color image and smoothes the luminance image and the saturation image by filtering using the smoothing kernel of the size set by the kernel setting device;

a change degree calculation device which calculates a change degree of a pixel value of each pixel of the acquired luminance image to the luminance image smoothed by the smoothing device and a change degree of a pixel value of each pixel of the acquired saturation image to the saturation image smoothed by the smoothing device; and a pixel value replacement device which replaces a pixel value of a pixel, whose change degree calculated from the luminance image is equal to or less than a predetermined value and whose change degree calculated from the saturation image is equal to or less than a predetermined value, of the acquired color image with a predetermined constant value, wherein the lane mark detection image acquisition device acquires the color image, which is obtained by the replacement of the pixel values by the pixel value replacement device, as the lane mark detection image.

6. The lane recognition apparatus according to claim 1, wherein the equipment selects and outputs one of a plurality of types of information calling for attention to a driver of the vehicle and the vehicle equipment control device selects the information calling for attention output to the driver by using the equipment according to the recognition result of the lane recognition device.

7. The lane recognition apparatus according to claim 1, wherein the equipment makes a change among a plurality of traveling controls of the vehicle and the vehicle equipment control device makes the change among the traveling controls of the vehicle by using the equipment according to the recognition result of the lane recognition device.

8. A vehicle equipped with an imaging device and having a function of recognizing a lane along which the vehicle is traveling from a color image of a road acquired via the imaging device, comprising:

a lane mark detection image acquisition device which acquires a lane mark detection image, which is divided into a first image region composed of pixels having pixel values supposed to be image portions of a lane mark defining the lane and a second image region composed of other pixels, from the color image of the road acquired via the imaging device;

a clustering device which performs clustering in which the first image region of the lane mark detection image is divided into subregions each composed of adjacent pixels;

a color determination device which determines a color of the subregions of the first image region obtained by the division in the clustering;

a lane recognition device which performs line component extraction for each group, considering the subregions determined to have the same color by the color determination device as a single group, and recognizes a line position of the lane defined by the lane mark from the extracted line component;

a type determination device which determines the type of the lane mark defining the lane recognized from the line component on the basis of a distribution state of the subregions, which exist in the vicinity of the line component, constituting the group from which the line component is extracted; and a vehicle equipment control device which controls equipment of the vehicle according to a recognition result of the lane recognition device, wherein the vehicle equipment control device controls the equipment of the vehicle at least according to the line position of the lane recognized by the lane recognition device and the type of the lane mark defining the lane.

9. A lane recognition system for a vehicle including a computer processor and a non-transitory computer readable medium for storing computer instructions which causes the computer processor to recognize a lane along which a vehicle is traveling from a color image of a road acquired via an imaging device mounted on the vehicle, the computer instructions having functions of causing the computer processor to perform:

lane mark detection image acquisition for acquiring a lane mark detection image, which is divided into a first image region composed of pixels having pixel values supposed to be image portions of a lane mark defining the lane and a second image region composed of other pixels, from the color image of the road acquired via the imaging device;

clustering for dividing the first image region of the lane mark detection image into subregions each composed of adjacent pixels;

color determination for determining a color of the subregions of the first image region obtained by the division in the clustering;

lane recognition for performing line component extraction for each group, considering the subregions determined to have the same color by the color determination as a single group, and recognizing a line position of the lane defined by the lane mark from the extracted line component;

type determination which determines the type of the lane mark defining the lane recognized from the line component on the basis of a distribution state of the subregions, which exist in the vicinity of the line component, constituting the group from which the line component is extracted; and vehicle equipment control for controlling equipment of the vehicle according to a result of the lane recognition, wherein the vehicle equipment control controls the equipment of the vehicle at least according to the line position of the lane recognized by the lane recognition and the type of the lane mark defining the lane.

10. The lane recognition apparatus according to claim 1, wherein the type determination device calculates a ratio between a length of a line segment from the nearest place to the vehicle to the farthest place from the vehicle of the subregions and a total sum of lengths of each subregion, and determines the type of the lane mark to be a solid line if the calculated ratio is equal to or greater than a predetermined value, and determines the type of the lane mark to be a broken line if the calculated ratio is less than the predetermined value.

11. The lane recognition apparatus according to claim 4, wherein a horizontal size of the kernel is set to a value that decreases as a distance from the vehicle increases.

12. The lane recognition apparatus according to claim 5, wherein a horizontal size of the kernel is set to a value that decreases as a distance from the vehicle increases.

13. A lane recognition apparatus for a vehicle which recognizes a lane along which a vehicle is traveling from a color image of a road acquired via an imaging device mounted on the vehicle, comprising:

a lane mark detection image acquisition device which acquires a lane mark detection image, which is divided into a first image region composed of pixels having pixel values supposed to be image portions of a lane mark defining the lane and a second image region composed of other pixels, from the color image of the road acquired via the imaging device;

a clustering device which performs clustering in which the first image region of the lane mark detection image is divided into subregions each composed of adjacent pixels;

a color determination device which determines a color of the subregions of the first image region obtained by the division in the clustering;

a lane recognition device which performs line component extraction for each group, considering the subregions determined to have the same color by the color determination device as a single group, and recognizes a line position of the lane defined by the lane mark from the extracted line component;

a kernel setting device which sets a kernel having a size whose predetermined direction width is within a predetermined range greater than the predetermined direction width of the image portion of the lane mark for the color image acquired via the imaging device;

a smoothing device which smoothes the acquired color image by filtering using the smoothing kernel of the size set by the kernel setting device;

a change degree calculation device which calculates a change degree of a pixel value of each pixel of the acquired color image for the color image smoothed by the smoothing device;

a pixel value replacement device which replaces a pixel value of a pixel, whose change degree is equal to or less than a predetermined value, of the acquired color image with a predetermined constant value; and a vehicle equipment control device which controls equipment of the vehicle according to a recognition result of the lane recognition device, wherein the lane mark detection image acquisition device acquires the color image, which is obtained by the replacement of the pixel values by the pixel value replacement device, as the lane mark detection image.

14. The lane recognition apparatus according to claim 13, wherein a horizontal size of the kernel is set to a value that decreases as a distance from the vehicle increases.

15. A lane recognition apparatus for a vehicle which recognizes a lane along which a vehicle is traveling from a color image of a road acquired via an imaging device mounted on the vehicle, comprising:

a lane mark detection image acquisition device which acquires a lane mark detection image, which is divided into a first image region composed of pixels having pixel values supposed to be image portions of a lane mark defining the lane and a second image region composed of other pixels, from the color image of the road acquired via the imaging device;

a clustering device which performs clustering in which the first image region of the lane mark detection image is divided into subregions each composed of adjacent pixels;

a color determination device which determines a color of the subregions of the first image region obtained by the division in the clustering;

a lane recognition device which performs line component extraction for each group, considering the subregions determined to have the same color by the color determination device as a single group, and recognizes a line position of the lane defined by the lane mark from the extracted line component;

a kernel setting device which sets a kernel having a size whose predetermined direction width is within a predetermined range greater than the predetermined direction width of the image portion of the lane mark for the color image acquired via the imaging device;

a smoothing device which acquires a luminance image having pixel values representing luminance and a saturation image having pixel values representing saturation, which are calculated from color components of the acquired color image and smoothes the luminance image and the saturation image by filtering using the smoothing kernel of the size set by the kernel setting device;

a change degree calculation device which calculates a change degree of a pixel value of each pixel of the acquired luminance image to the luminance image smoothed by the smoothing device and a change degree of a pixel value of each pixel of the acquired saturation image to the saturation image smoothed by the smoothing device;

a pixel value replacement device which replaces a pixel value of a pixel, whose change degree calculated from the luminance image is equal to or less than a predetermined value and whose change degree calculated from the saturation image is equal to or less than a predetermined value, of the acquired color image with a predetermined constant value; and a vehicle equipment control device which controls equipment of the vehicle according to a recognition result of the lane recognition device, wherein the lane mark detection image acquisition device acquires the color image, which is obtained by the replacement of the pixel values by the pixel value replacement device, as the lane mark detection image.

16. The lane recognition apparatus according to claim 15, wherein a horizontal size of the kernel is set to a value that decreases as a distance from the vehicle increases.

* * * * *